United States Patent [19]

Schiffl

[11] Patent Number: 4,473,822

[45] Date of Patent: Sep. 25, 1984

[54] METHOD OF AND A DEVICE FOR SENSING OBJECTS

[75] Inventor: Heinz Schiffl, Munich, Fed. Rep. of Germany

[73] Assignee: Agfa-Gevaert AG, Leverkusen, Fed. Rep. of Germany

[21] Appl. No.: 374,596

[22] Filed: Apr. 30, 1982

[30] Foreign Application Priority Data

Apr. 30, 1981 [DE] Fed. Rep. of Germany ....... 3117236

[51] Int. Cl.³ .................... G08B 21/00; G01R 27/26
[52] U.S. Cl. .................................... 340/674; 340/675; 367/93; 73/579
[58] Field of Search ................ 73/579, 584, 599, 600; 367/93; 340/38 S, 621, 674, 675, 676

[56] References Cited

U.S. PATENT DOCUMENTS

| 3,646,372 | 2/1972 | Snellman et al. ............... 340/675 |
| 3,960,007 | 6/1976 | Swensen ............................. 367/93 |
| 4,227,182 | 10/1980 | Ogasawara et al. ............. 73/579 |
| 4,368,438 | 1/1983 | Stienstra ........................... 340/675 |

*Primary Examiner*—James J. Gill
*Assistant Examiner*—John E. Chapman, Jr.
*Attorney, Agent, or Firm*—Michael J. Striker

[57] ABSTRACT

A single ultrasonic generator is employed for detecting objects, particularly copies processed in photographic devices. The sound-radiating surface of the generator is spaced apart from a reference plane about a distance equal to an integer multiple of half the wavelength of the ultrasonic waves. The changes of damping of the ultrasonic resonance circuit resulting from the acoustic load variations are measured in an electronic evaluation circuit.

2 Claims, 1 Drawing Figure

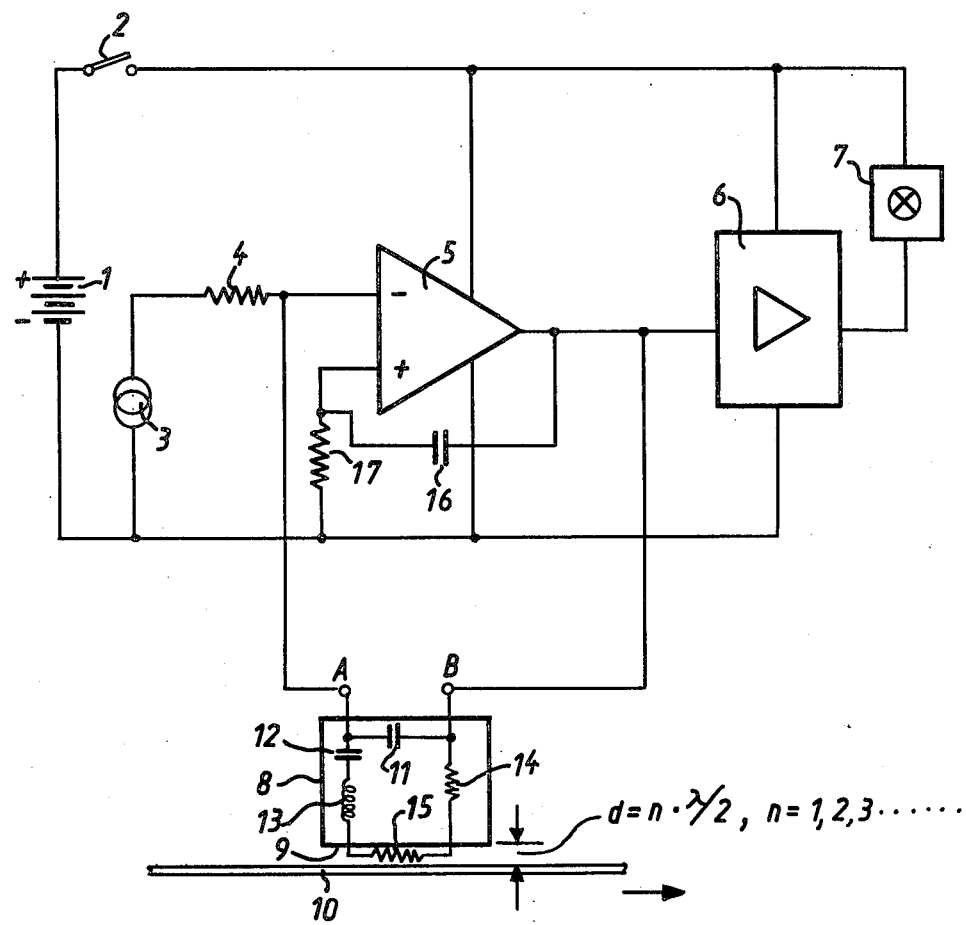

METHOD OF AND A DEVICE FOR SENSING OBJECTS

BACKGROUND OF THE INVENTION

The present invention relates in general to an ultrasonic sensing or scanning method, and in particular to a method of and a device for detecting or scanning objects, particularly original photographic copies processed in photographic devices, by means of an ultrasonic measuring apparatus.

From the German published patent application No. 26 42 633 a detecting device of this kind is known which senses the presence of sheets movable along a predetermined track. This prior-art device includes an ultrasonic generator which directs an ultrasonic field against the sheets movable in the track, and an ultrasonic receiver is arranged for receiving and evaluating ultrasonic energy transmitted by the generator. The ultrasonic generator and the ultrasonic receiver are located at opposite sides of the sheet track.

Known are also electrooptical sensing devices employing the so-called light barrier technique for detecting and scanning the objects. Also, mechanical feeling elements are known which upon contact with the sensed object change their position and are coupled to a device for recording this change.

SUMMARY OF THE INVENTION

A general object of the present invention is to provide a contactless method and device for sensing or scanning thin objects movable on a fixed reference plane such as photographic prints or films moving on a track which is insensitive to interferences and operates independently from the thickness of the sensed objects.

An additional object of the invention is to provide such a sensing or scanning device which is assembled of fewer component parts than prior-art devices of this kind.

In keeping with these objects and others that will become apparent hereafter, one feature of the invention resides, in the method which comprises the steps of placing a single ultrasonic generator at a distance from a reference plane which is an integral multiple of the half wavelength of the generated ultrasonic wave, directing the waves against the reference plane, and measuring the acoustic load variations of the generator to produce a signal which is indicative of the presence and quality of the sensed objects. The device for carrying out this method has preferably an ultrasonic generator including a piezoelectric ceramic transducer having its vibrating surface spaced from the reference plane about the half wavelength of the ultrasonic waves, the transducer being connected to an electronic measuring device which indicates variations of electrical parameters of the transducer as a function of changes of the acoustic load. If no object is present in the reference plane, then the acoustic load of the transducer, which can be represented by an electric substitute diagram, has a certain value of its load-dependent impedance which is determined by the minimum damping of the ultrasonic signal of the generator operating in the resonance range. The magnitude of this load-dependent impedance is determined by the medium in which the ultrasonic waves propagate. If an object to be scanned is brought into the reference plane in front of the source of ultrasonic waves, then a standing ultrasonic wave is produced which has its nodes on the vibrating surface of the ultrasonic generator and on the facing surface of the scanned object. Since in the case of a standing wave in air the air molecules vibrate at a phase difference of 180°, the nodes of the standing wave where the air molecules vibrate in opposite directions are the points of largest pressure variation. When the air molecules move against each other, then pressure in the range of the nodes exceeds the pressure of the undisturbed ambient air, whereas when the air molecules start departing from each other, the air pressure in the nodes decreases. The pressure nodes are present in the range of the maximum amplitude of the standing wave, and therefore the pressure is proportional to the velocity of the sound. When the spacing of the sound generator from the scanned object is equal to an integer multiple of the half wavelength of the sound, then a maximum counterpressure acts on the sound-emitting surface of the ultrasonic generator. Consequently, the sound-emitting surface is exposed to maximum load, and the damping or load-dependent impedance of the oscillating system has its maximum value. These damping variations are electrically measurable and can be applied to an interpreting circuit.

By virtue of this invention, it is now possible to detect by means of a single ultrasonic generator whether an object is present in the reference plane or not. Since the ultrasonic generator exhibits a relatively sharp resonance curve, any interferences or leakage phenomena are practically eliminated.

Preferably, the device for carrying out the method of this invention includes an ultrasonic generator consisting of a single piezoelectric ceramic transducer. In the preferred embodiment of this invention, the piezoelectric ultrasonic transducer is connected between the output of an operational ampifier and its inverting input. In this manner, the acoustic impedance of the ultrasonic generator and the damping variations influence the gain of the operational amplifier.

In a further elaboration of this invention, a compensation circuit including a resistor and a capacitor is connected between the non-inverting input and the output of the operational ampifier. The output of the operational amplifier is connected to an interpreting circuit including preferably an electrical signal indicator.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE shows schematically a circuit diagram of the ultrasonic sensing device according to this invention.

DESCRIPTION OF THE PREFERRED EMBODIMENT

In the FIGURE, the ultrasonic sensing or scanning circuit includes a pulse generator 3 operating at a pulse rate or frequency fr. The pulse generator 3 is connected through a resistor 4 to an inverting input (−) of an operational amplifier 5 and to a terminal A of a piezoelectric ultrasonic generator 8 of a piezoceramic material. The output of the operational amplifier 5 is connected to the other terminal B of the ultrasonic generator 8 and is also connected through an amplifier 6 to a signal indicator 7. Instead of the signal indicator, a relay or a servomotor can be used. The vibrating surface 9 of the ultrasonic generator 8 is spaced apart from a reference plane defined by the upper surface of an object 10 by a distance which equals an integer multiple of the half wavelength of the ultrasonic waves.

The piezoelectric ceramic generator is represented in the substitute electrical circuit diagram as a combination of a capacitance, resistance and inductance. Reference numeral 11 indicates the capacity of the piezoceramic transducer less the capacity of the mechanical circuit; reference numeral 12 indicates the capacity of the mechanical circuit and 13 refers to the inductivity of the mechanical circuit. Reference numeral 14 denotes a resistance representing the mechanical losses of the piezoceramic transducer, while the resistor 15 represents the useful load of the transducer resulting from the actually radiated acoustic energy. The resistor 15 is the measure both of the properties of the medium surrounding the piezoceramic transducer and of acoustic forces acting on the vibrating surface 9 of the transducer. The capacitance 11 is parallel-connected with the series connection of the capacitance 12, inductance 13 and the resistance 15.

A compensation capacitor 16 is connected between the non-inverting input (+) of the operational amplifier 5 and the output of the latter, and the non-inverting input is connected via a resistor 17 to the minus pole of a power supply battery 1. The plus pole of the battery is connected through a switch 2 to the operational amplifier 5, to the end amplifier 6, and to the signal indicator 7.

The piezoceramic transducer 8 oscillates normally at its resonance frequency, at which it also radiates maximum acoustic energy. The resonance frequency fr is produced by the pulse generator 3 and the impedance of the transducer 8 is adjusted by the compensating circuit 16 and 17. The capacitor 16 of the compensating circuit affects the capacitance 11 of the transducer 8, thus increasing the influence of the impedance 15 of the transducer on the inverting input of the operational amplifier.

If no object, such as for example an original photographic copy, is present in the reference plane 10 below the transducer 8, the resistance 15 has its minimum value, resulting from the static condition of the ambient air medium. The damping of the piezoelectric transducer 8 is therefore negligible. Consequently, the impedance of piezoelectric radiator 8 has its maximum value, and since the transducer terminals A, B are connected in the feedback path of the operational amplifier 5, the feedback from the output to the inverting input of the amplifier 5 has its lowest value, and the gain of the operational amplifier is set to its maximum value.

If an object becomes located at the spacing d from the active surface 9 of the transducer 8, then the aforementioned standing wave is generated, which causes an increased counterpressure on the active surface 9 of the transducer 8, which in turn causes an increased damping of the latter. This increased damping is represented by a substantially increased resistance value of the resistor 15 in the substitute circuit. Due to the higher value of the resistance 15, the resonance voltage or the value of the impedance of the piezoelectric generator 8 is considerably reduced. The decreased impedance of the ultrasonic generator 8 due to the presence of an object in the reference plane 10 causes a strong feedback in the operational amplifier 5 which substantially decreases its output voltage. This voltage difference is indicated by the indicator 7 and serves as a measure of the presence of an object in the reference plane.

The signal indicator 7 can be in the form of a signal lamp, for example, which is activated when no object is present in the reference plane and inactivated when an object enters the measuring range in the plane 10.

It will be understood that each of the elements described above, or two or more together, may also find a useful application in other types of constructions differing from the types described above.

While the invention has been illustrated and described as embodied in a specific example of the ultrasonic measuring device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for sensing or scanning thin objects disposed on a reference plane, such as photographic prints or films moving on a track, comprising a single piezoelectric ultrasonic generator of a piezoceramic material having a radiation surface located at a distance from the reference plane which equals an integer multiple of the half wavelength of the generated ultrasonic waves, electronic means connected to said ultrasonic generator for measuring the damping of the ultrasonic generator caused by the acoustic load variations, said electronic means including an operational amplifier having an output, an inverting input and a non-inverting input; said ultrasonic generator being connected between said output and said inverting input; and further including a compensating circuit formed of a capacitor connected between the non-inverting input and the output of the amplifier and a resistor connecting the non-inverting input to ground, said compensating circuit being dimensioned for increasing the sensitivity of said ultrasonic generator.

2. A device as defined in claim 1, wherein said electronic means further includes a signal indicator connected to the output of said operational amplifier.

* * * * *